United States Patent
Baumgart et al.

(10) Patent No.: US 7,310,197 B2
(45) Date of Patent: Dec. 18, 2007

(54) SIMULTANEOUS MEASUREMENT OF CONTACT POTENTIAL AND SLIDER BODY CLEARANCE IN A MAGNETIC DISK DRIVE

(75) Inventors: Peter Michael Baumgart, San Jose, CA (US); Malk Duwensee, Del Mar, CA (US); Bernhard E. Knigge, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 11/152,912

(22) Filed: Jun. 15, 2005

(65) Prior Publication Data

US 2006/0284620 A1    Dec. 21, 2006

(51) Int. Cl.
G11B 21/02    (2006.01)
G11B 27/36    (2006.01)
G11B 5/596    (2006.01)

(52) U.S. Cl. .......................................... 360/75; 360/31
(58) Field of Classification Search ...................... None
See application file for complete search history.

(56) References Cited

U.S. PATENT DOCUMENTS

| | | |
|---|---|---|
| 5,136,250 A | 8/1992 | Abdelli |
| 5,153,785 A | 10/1992 | Muranushi et al. |
| 5,453,884 A | 9/1995 | Ohta et al. |
| 6,359,746 B1 | 3/2002 | Kakekado et al. |
| 6,529,342 B1 * | 3/2003 | Feng et al. .................... 360/75 |
| 6,700,724 B2 | 3/2004 | Riddering et al. |
| 6,785,081 B2 * | 8/2004 | Chapin et al. ................ 360/75 |
| 7,016,139 B2 * | 3/2006 | Baumgart et al. ............ 360/75 |
| 2003/0043497 A1 | 3/2003 | Riddering et al. |
| 2006/0002001 A1 * | 1/2006 | Fong et al. .................... 360/75 |

FOREIGN PATENT DOCUMENTS

| | | |
|---|---|---|
| JP | 57060566 | 4/1982 |
| JP | 62159385 | 7/1987 |
| JP | 3283152 | 12/1991 |
| JP | 5223781 | 8/1993 |
| JP | 5273276 | 10/1993 |
| JP | 9097483 | 4/1997 |

OTHER PUBLICATIONS

"Non-Destructive Measurement of the Lubricant Distribution on Magnetic Disks" IBM TDB, Jul. 1985, pp. 695ff.
"Tribocharging of the magnetic hard disk drive head-disk interface" Journal of Applied Physics, vol. 91, No. 7, pp. 4631ff.

(Continued)

Primary Examiner—William R. Korzuch
Assistant Examiner—Jason Olson

(57) ABSTRACT

A method for simultaneously measuring contact potential and slider body clearance in a hard disk drive. In embodiments of the present invention, a plurality of direct current (DC) pulses are applied between a slider body and a hard disk of a magnetic disk drive. The contact potential voltage between the slider body and the hard disk is determined in response to applying the plurality of direct current (DC) pulses. The voltage of the plurality of direct current (DC) pulses is increased until a contact between the slider body and the hard disk is detected.

20 Claims, 10 Drawing Sheets

OTHER PUBLICATIONS

"Air Bearing Magnetic Head Slider Providing a Correlation Technique Between Readback Signal Modulation and Head-To-Disk Spacing Variation . . . " IBM TDB, Dec. 19833, pp. 3364ff.

"Influence of Contact Potential on Slide-Disk Spacing: Simulation and Experiment" IEE Mag vol. 40, No. 4, pp. 3165ff.
Advances in Information Storage and Processing Systems, 1995 vol. 1, pp. 49ff (abstract only).

* cited by examiner

SIMULTANEOUS MEASUREMENT OF CONTACT POTENTIAL AND SLIDER BODY CLEARANCE IN A MAGNETIC DISK DRIVE

FIELD OF THE INVENTION

Embodiments of the present invention are related to measurement of contact potential voltages between a slider body and a disk surface of a hard disk drive. Embodiments of the present invention are also related to measurement of clearance of the slider body above the surface of the hard disk drive.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a substantially constant rotational speed. An actuator arm or slider is utilized to reach out over the disk. The arm has a head-gimbal-assembly (HGA) composed of a suspension, flexure and a slider carrying the read/write components.

In operation, the hard disk is rotated at a set speed via a spindle motor assembly having a central drive hub. Additionally, there are tracks evenly spaced at known intervals across the disk. When a request for a read of a specific portion or track is received, the actuator and servo-system of the hard drive aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

As the data storage industry constantly strives to improve data storage density, it is becoming increasingly important to reduce the clearance of slider assembly over the surface of the magnetic disk. However, as the slider-to-disk spacing becomes smaller than 10 nanometers (10 nm), the electrostatic and intermolecular forces between the slider and disk become increasingly significant. Therefore, a need exists for determining localized contact potential voltages and localized clearance data between a slider body and a hard disk of a hard disk drive.

However, the small drives have small components with very narrow tolerances. Disk drive sliders are designed to fly in very close proximity to the disk surface. For instance, in some systems slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference that exists between two different metals (different Fermi levels of slider and disk material); and impacts between the slider and disk surface. These forces alone, and in combination, create bouncing vibrations in the slider that can cause media damage and can also cause data loss during read and write operations.

SUMMARY OF THE INVENTION

A method for simultaneously measuring contact potential and slider body clearance in a hard disk drive. In embodiments of the present invention, a plurality of direct current (DC) pulses are applied between a slider body and a hard disk of a magnetic disk drive. The contact potential voltage between the slider body and the hard disk is determined in response to applying the plurality of direct current (DC) pulses. The voltage of the plurality of direct current (DC) pulses is increased until a contact between the slider body and the hard disk is detected.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
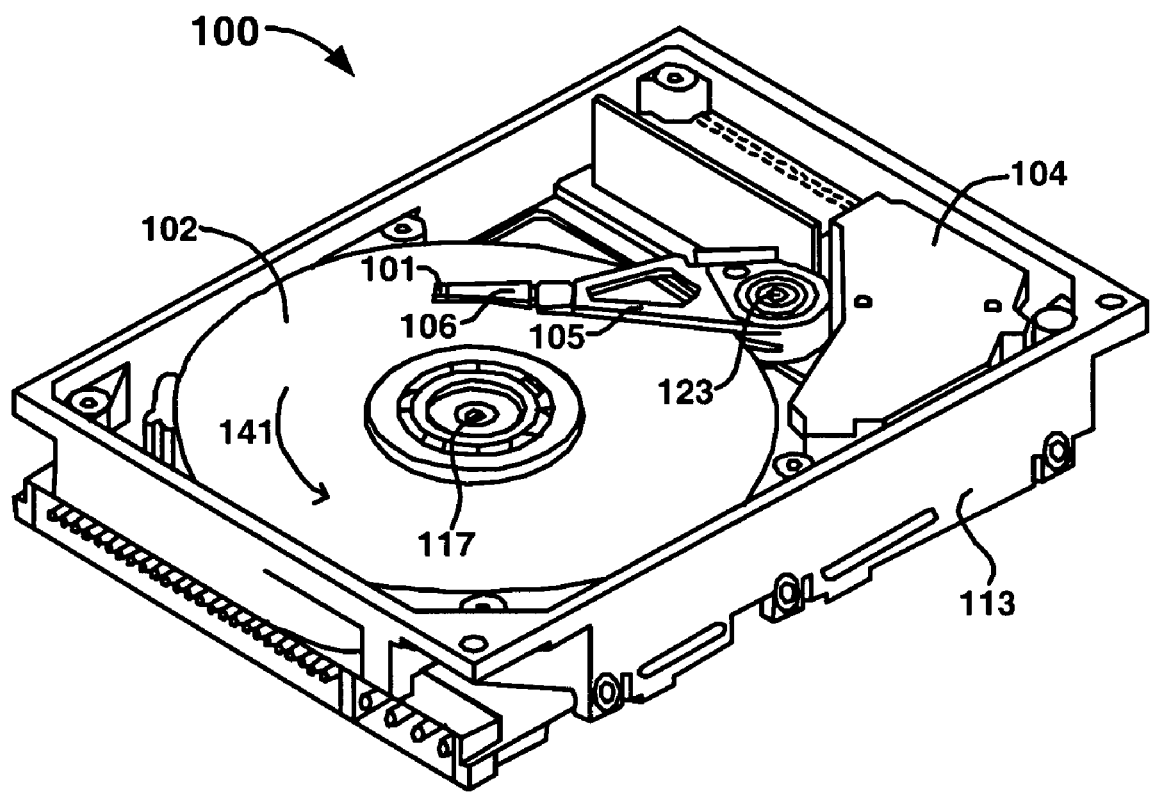
FIG. 1 is a perspective view of an exemplary hard disk drive.

With reference now to FIG. 1, a schematic drawing of one embodiment of a magnetic hard disk file or drive 100 for a computer system is shown. Drive 100 has an outer housing or base 113 containing a disk pack having at least one media or magnetic disk 102. The disk or disks 102 are rotated (see arrows 141) by a spindle motor assembly having a central drive hub 117. An actuator comprising a plurality of parallel actuator arms 105 (one shown) in the form of a comb that is movably or pivotally mounted to base 113 about a pivot assembly 123. A controller (not shown) is also mounted to base 113 for selectively moving the comb of arms 105 relative to disk 102.

In the embodiment shown, each arm 105 has extending from it at least one cantilevered load beam and suspension 106. A magnetic read/write transducer or head is mounted on a slider 101 and secured to a flexure that is flexibly mounted to each suspension 106. The read/write heads magnetically read data from and/or magnetically write data to disk 102. The level of integration called the head gimbal assembly (HGA) is head and the slider 101, which are mounted on suspension 106. The slider 101 is usually bonded to the end of suspension 106. The head is typically pico size (approximately 1245×1000×300 microns) and formed from ceramic or intermetallic materials. The head also may be of "femto" size (approximately 850×700×230 microns) and is pre-loaded against the surface of disk 102 (in the range two to ten grams) by suspension 106.

Suspensions 106 have a spring-like quality, which biases or urges the air-bearing surface of the slider 101 against the disk 102 to cause the slider 101 to fly at a precise distance from the disk. An actuator 104 (e.g., a voice coil motor) is also mounted to arms 105 opposite the head gimbal assemblies. Movement of the actuator 104 by the controller moves the head gimbal assemblies along radial arcs across tracks on the disk 102 until the read/write transducer is positioned above the desired data track. The head gimbal assemblies operate in a conventional manner and typically move in unison with one another, unless drive 100 uses multiple independent actuators (not shown) wherein the arms can move independently of one another.

Figure 2:
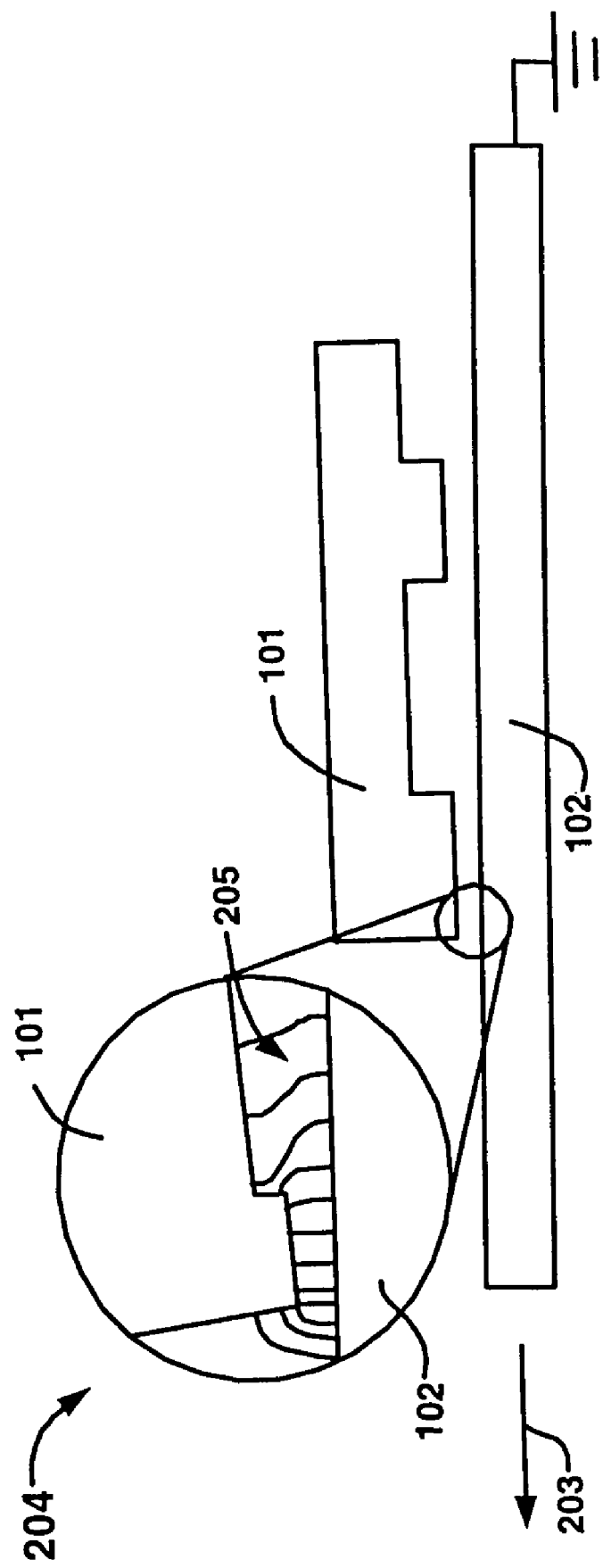
FIG. 2 shows an exemplary electrostatic field that exists between a slider body and a hard disk of a hard disk drive.

FIG. 2 shows in greater detail, the electrostatic interaction between slider body 101 and magnetic disk 102. In operation, magnetic disk 102 rotates from right to left with respect to slider body 101 (e.g., typically shown as arrow 203). Enlargement 204 of the slider/disk interface shows lines representing an electric field 205 that is formed from a potential difference between slider body 101 and hard disk 102. One source for the potential difference is the contact potential that originates from the conducting portions of the slider body 101 and hard disk 102 having different work functions.

The work function of a material is the amount of energy that is needed for releasing electrons from the surface of the material, and is related to the optical, electrical and mechanical properties of the material. When two materials having different work functions are brought together, electrons in the material having the higher work function tend to flow to the material having the lower work function. When the materials are made into a parallel plate capacitor, equal and opposite surface charges form on each material. The voltage formed between the plates of the capacitor from these charges is referred to as a "contact potential." In a typical slider/disk interface, the conducting part of the slider body (e.g., 101) is sintered $Al_2O_3$—TiC and the conducting part of the disk (e.g., 102) is a cobalt based alloy magnetic layer. Even if the slider and disk are both grounded, a potential difference can exist between them due to the contact potential, which may generate an electrostatic force greater than the van der Waals force.

Figure 3:
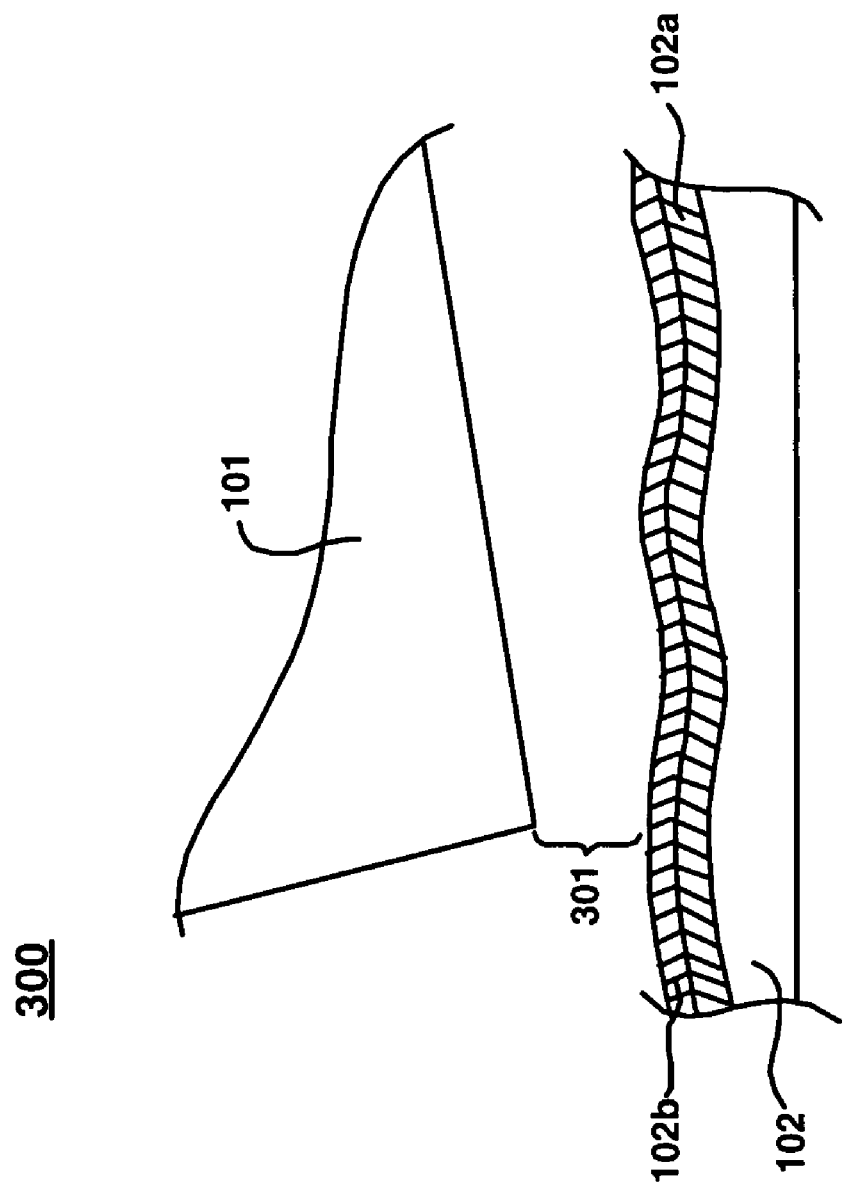
FIG. 3 shows in greater detail the relationship between a slider body and a hard disk of a hard disk drive.

As shown in FIG. 3, the respective work functions of the slider body and hard disk are further modified by overcoats and lubricants that are deposited for tribology protection. In FIG. 3, hard disk 102 is coated with a carbon coating 102a and a lubricant layer 102b. As shown in FIG. 3, the mechanical spacing between hard disk 102 and slider body 101 can be greater than the distance (e.g., 301) between slider body 101 and lubricant layer 102b which is typically referred to as the "clearance" of slider body 101. The slider to disk clearance is typically defined by the lowest point on the slider and the highest point on the disk. Hence, variations in the disk topography of disk 102 can affect the clearance of slider body 101.

When in operation the rotation speed of disk 102 induces shear forces which can act upon lubricant layer 102b causing it to separate from carbon coating 102a. The lubricant layer 102b can then migrate to other portions of disk 102 in an uneven manner which affects the clearance of slider body 101. Furthermore, this effect is enhanced due to the electrostatic field of the slider/disk interface which tends to draw the lubricant into the slider/disk interface.

Figure 4:
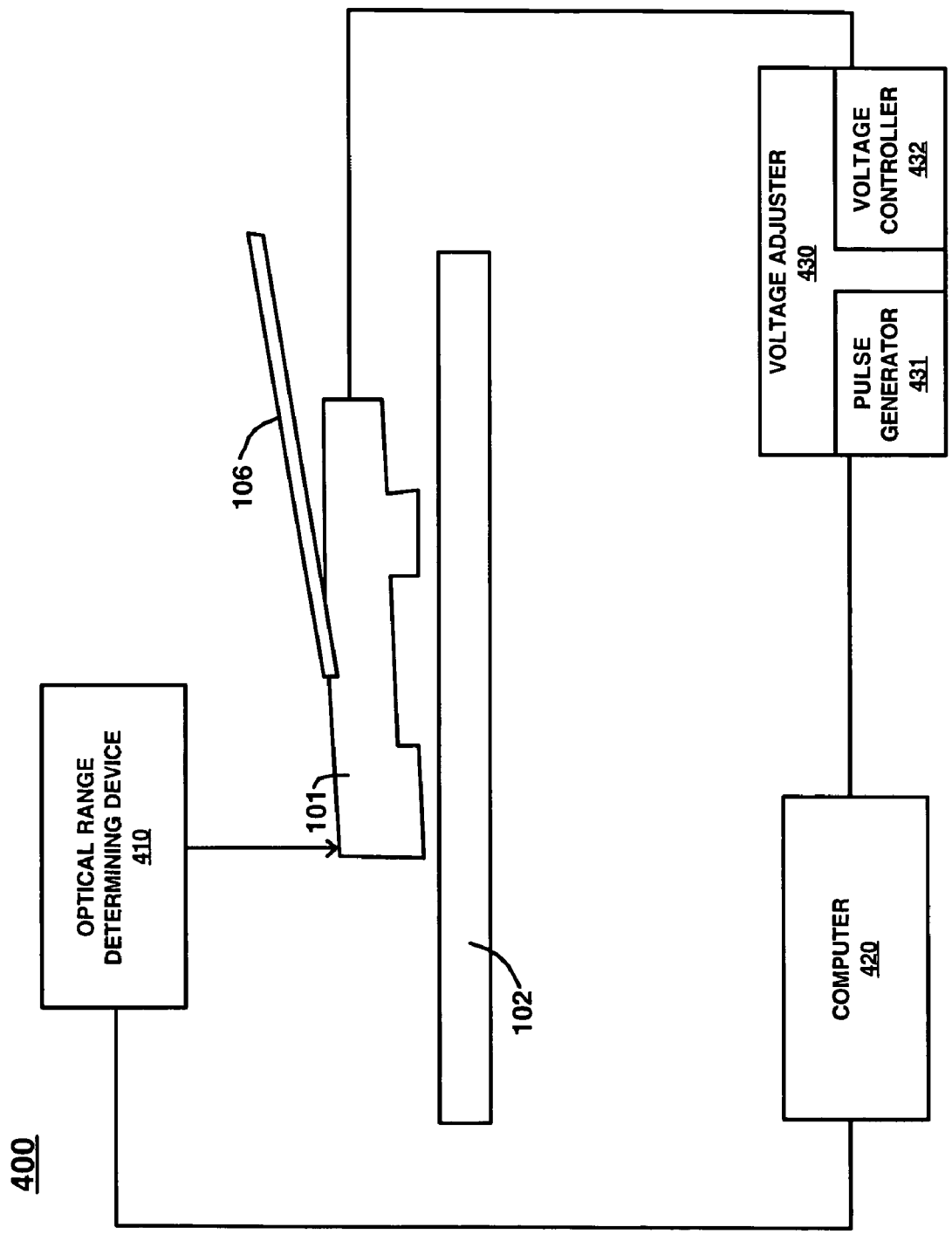
FIG. 4 shows a system for simultaneously determining contact potential voltages and clearance data between a slider body and a hard disk of a hard disk drive in accordance with embodiments of the present invention.

FIG. 4 shows a system for simultaneously determining contact potential voltages and clearance data between a slider body and a hard disk of a hard disk drive in accordance with embodiments of the present invention. In FIG. 4, a computer 420 is coupled with a voltage adjuster 430 and an optical range determining device 410. In embodiments of the present invention, optical range determining device 410 is a laser measuring device such as a laser interferometer, a laser Doppler vibrometer, a near-field solid immersion lens (SIL) device, etc. In operation, optical range determining device 410 is optically coupled with slider body 101 and determines a distance thereto which can be used to determine the clearance change of slider body 101 relative to hard disk 102.

While the embodiment of FIG. 4 shows the use of a laser measuring device, embodiments of the present invention are well suited to utilize other methods to determine the clearance change of slider body 101 relative to hard disk 102. In one embodiment, the read back signal amplitude change is used to determine spacing change. The read back signal amplitude vs spacing is described by the Wallace spacing equation which can be used to determine the clearance of slider body 101 relative to hard disk 102. More specifically, the amplitude of the readback signal varies exponentially to the clearance of slider body 101. Thus, when slider body 101 is closer to hard disk 102 (e.g., at a reduced clearance), the amplitude of the readback signal will be greater than when slider body 101 is further away from hard disk 102. In another embodiment of the present invention, the contact of slider body 101 can be identified based on the Position Error Signal (PES) that is generated in a well known manner.

In another embodiment, a change in capacitance between slider body 101 and hard disk 102 is detected in response to a change in slider body clearance. For example, in embodiments of the present invention, slider body 101 is electrically isolated from suspension 106. As a result, system 400 effectively forms a capacitive loop and the slider body clearance will vary in response to changes in the voltage applied to the slider body/hard disk interface. A change in the capacitance (measured at the slider body/hard disk interface) can be detected and used to determine the change in the slider body clearance.

In another embodiment, a change in the magneto-resistive resistance can be detected and used to determine a change in the slider body clearance. For example, as the clearance of slider body 101 relative to hard disk 102 decreases, the magneto-resistive resistance typically decreases due to increased disk cooling. Alternatively, the magneto-resistive resistance typically increases when contact between the slider body and hard disk occurs due to disk heating, thus causing an increase in the baseline magneto-resistive modulation.

Voltage adjuster 430 is coupled with slider body 101 and is for generating a plurality of direct current (DC) pulses. In the embodiment of FIG. 4, voltage adjuster 430 comprises a pulse generator 431 and a voltage controller 432. It is noted that the components shown in FIG. 4 are exemplary, and that in other embodiments of the present invention computer 420 may be integrated with voltage adjuster 430 and/or optical range determining device 410.

In embodiments of the present invention, a first control measurement is done without any voltages applied to the slider body. For example in revolution 1 (e.g., 510 of FIG. 5) no voltage (e.g., 0 volts) is applied between slider body 101 and hard disk 102 and the baseline readback signal amplitude is established. Concurrently, the voltage between the slider and disk is increased in small increments and the change in read back signal amplitude is noted and converted to spacing change. When the slider makes contact with the disk, a further increase in the applied voltage will not cause further reduction in spacing and hence will not lead to further increase in read back signal amplitude. The clearance can be estimated from the change of amplitude at contact to the initial read back signal amplitude with no voltage applied.

Figure 5A:
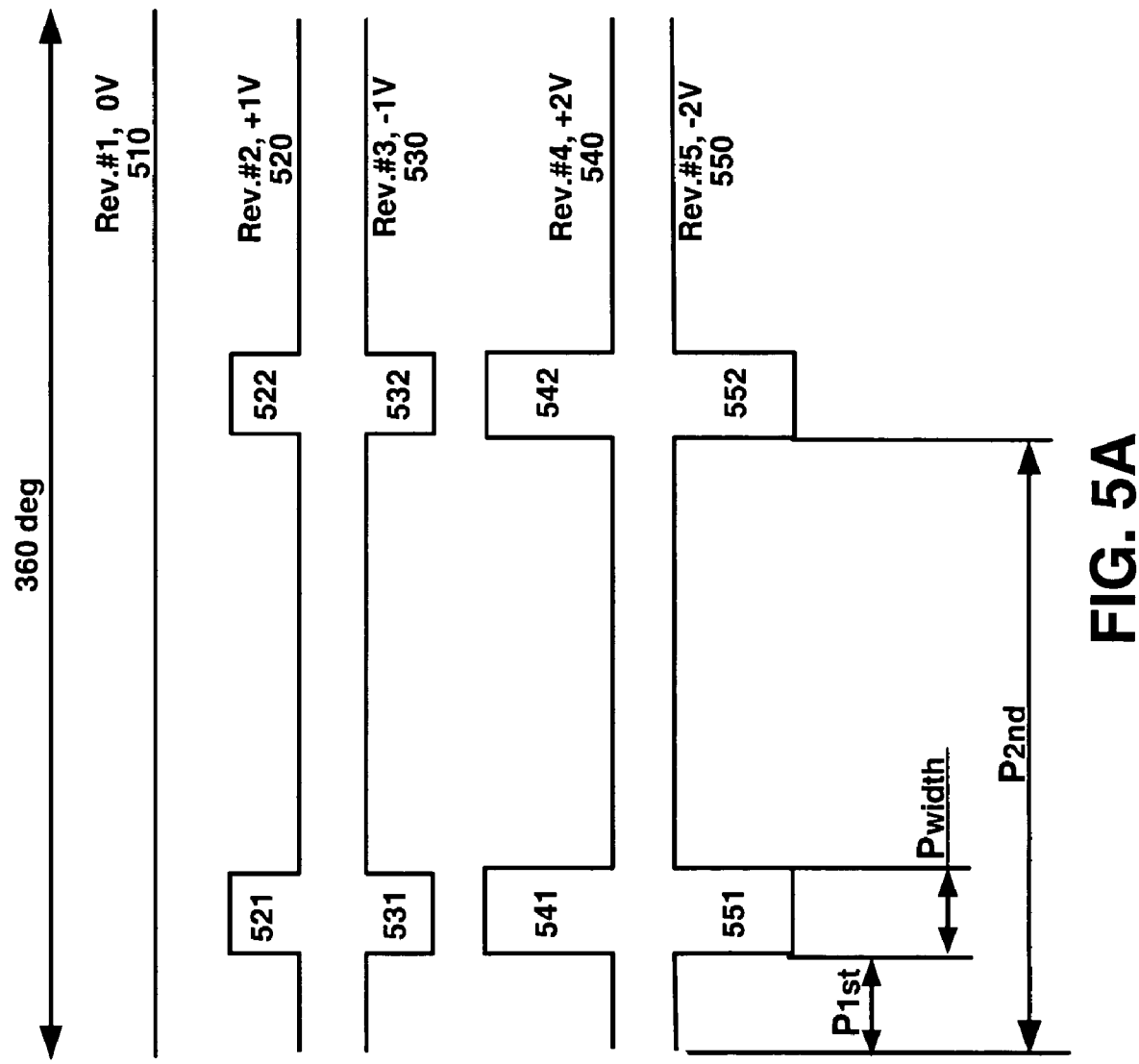
FIGS. 5A and 5B show exemplary bias voltages applied to discrete locations of a hard disk in accordance with embodiments of the present invention.

FIG. 5A shows exemplary bias voltages applied to discrete locations of a hard disk in accordance with embodiments of the present invention. In FIG. 5A, a complete revolution of hard disk 102 is represented as well as the bias voltages applied. It is noted that the bias voltages represented in FIG. 5A are applied while slider body 101 is located over a single data track of hard disk 102. In revolution 1 (e.g., 510) no voltage is applied between slider body 101 and hard disk 102. Concurrently, a measurement of the clearance of slider body 101 is made using, for example, optical range determining device 410. This measurement of the distance between slider body 101 and, for example, optical range determining device 410, provides a baseline measurement which will be used to determine a change in the clearance of slider body 101 relative to hard disk 102 when various voltages are applied at the slider body/hard disk interface.

In revolution 2 (e.g., 520) a first set of positive bias voltages (e.g., pulse 521 and pulse 522) are applied at between slider body 101 and hard disk 102. In the embodiment of FIG. 5A, pulse 521 and pulse 522 are one volt direct current (DC) pulses. It is noted that in embodiments of the present invention another voltage (e.g., one half volt) may be applied. Furthermore, the duration (e.g., Pwidth) of pulse 521 and pulse 522 is selected to minimize contact between slider body 101 and hard disk 102 should that occur. For example, in embodiments of the present invention, the pulse duration (e.g., Pwidth) is longer than the frequency of the pitch vibration of slider body 101 which is typically approximately 250 kHz. Thus, in the embodiment of FIG. 5A, the Pwidth for pulse 521 and pulse 522 is approximately 50 microseconds. While the present embodiment only shows two pulses per revolution of hard disk 102, it is appreciated that a greater or lesser number of pulses may be used in embodiments of the present invention. Thus, a variation in the clearance of slider body 101 is determined relative to the baseline measurement of clearance when no voltage is applied (e.g., 510).

In revolution 3 (530), a first set of negative bias voltages (e.g., pulse 531 and pulse 532) are applied between slider body 101 and hard disk 102. In the embodiment of FIG. 5A, pulse 531 and pulse 532 are one volt direct current (DC) pulses. Additionally, the duration (Pwidth) of pulse 531 and pulse 532 is selected as described above. It is noted that pulse 531 and pulse 532 are initiated such that they occur at the locations of hard disk 102 that coincide with the location of previously applied positive bias voltages 521 and 522 respectively. This can be accomplished, for example, by timing the initiation of pulse 531 and pulse 531 relative to the spindle index of hard disk 102, or relative to sector/servo positioning information. In embodiments of the present invention, a change in the clearance of slider body 101 relative to the baseline measurement (e.g., 510) is determined as described above concurrent with the application of pulses 531 and 532.

In revolution 4 (540), a second set of positive bias voltages (e.g., pulse 541 and pulse 542) are applied between slider body 101 and hard disk 102. In the embodiment of FIG. 5A, pulse 541 and pulse 542 are two volt direct current (DC) pulses. Additionally, the duration (Pwidth) of pulse 531 and pulse 532 is selected as described above. It is noted that pulse 541 and pulse 542 are initiated such that they occur at the locations of hard disk 102 that coincide with the location of previously applied voltages (e.g., 521, 522, 531, and 532) respectively. In embodiments of the present invention, a change in the clearance of slider body 101 relative to the baseline measurement (e.g., 510) is determined as described above concurrent with the application of pulses 541 and 542.

In revolution 5 (550), a second set of negative bias voltages (e.g., pulse 551 and pulse 552) are applied between slider body 101 and hard disk 102. In the embodiment of FIG. 5A, pulse 551 and pulse 532 are two volt direct current (DC) pulses. Additionally, the duration (Pwidth) of pulse 551 and pulse 552 is selected as described above. It is noted that pulse 551 and pulse 552 are initiated such that they occur at the locations of hard disk 102 that coincide with the location of previously applied voltage pulses 521, 522, 531, 532, 541, and 542, respectively. In embodiments of the present invention, a change in the clearance of slider body 101 relative to the baseline measurement (e.g., 510) is determined as described above concurrent with the application of pulses 551 and 552.

Figure 5B:
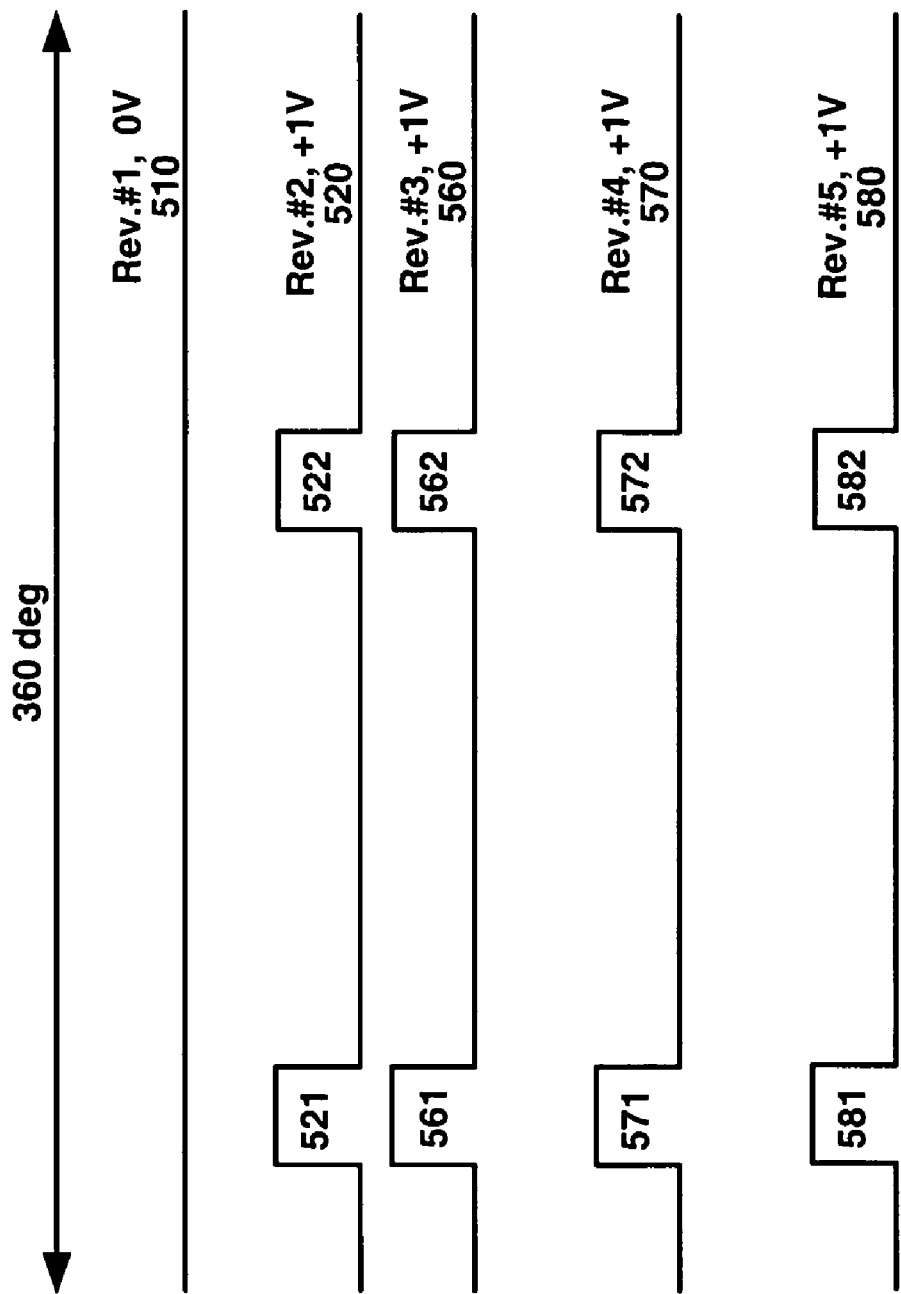

In another embodiment of the present invention, multiple DC pulses are applied in successive revolutions of hard disk 102 at a given voltage to determine an average variation in the clearance of slider body 101 at that given voltage and at a specific discrete location. Referring now to FIG. 5B, in revolution 1 (e.g., 510), no bias voltage is applied between slider body 101 and hard disk 102. In revolution 2 (e.g., 520), positive bias voltages are applied as described above with reference to FIG. 5A. However, in successive revolutions of hard disk 102 (e.g., revolutions 560, 570, 580), rather than increasing the voltage of the pulses and/or reversing the bias of them as was performed in FIG. 5A, the voltage pulses applied in revolution 2 (520) are repeated at the same location while concurrently measuring a change in the clearance of slider body 101 relative to the baseline measurement (e.g., 510). In so doing, embodiments of the present invention can account for variations in the clearance of slider body 101 relative to hard disk 102 due to vibration of the slider body caused by, for example, aerodynamic forces acting on the HGA. In conventional methods, a single pulse of longer duration is used to determine changes in the clearance of the slider body. Because of the longer duration of the pulse, the measurement of the clearance of the slider body does not account for vibration of the slide body. Thus, embodiments of the present invention determine variations in the clearance of slider body 101 in response to changes in the biasing of the slider/hard disk interface more precisely than conventional methods.

As shown in FIGS. 5A and 5B, embodiments of the present invention facilitate simultaneously determining localized contact potential voltages and localized clearance data between slider body 101 and hard disk 102. In embodiments of the present invention, the voltage of the DC pulses applied between slider body 101 and hard disk 102 are increased until a contact between them is detected, which facilitates determining the absolute clearance of slider body 101 relative to hard disk 102 at a given voltage. In conventional methods, the use of long duration voltage pulses increases the likelihood of damage to the slider body and/or magnetic read/write transducer due to extended contact with the hard disk. However, in embodiments of the present invention, this contact is reduced due to the shorter duration (e.g., Pwidth) of the DC pulses.

Additionally, because of the short duration of the voltage pulses, multiple discreet portions of a data track of hard disk 102 can be measured. Conventional clearance measurement methods, which typically utilize much longer bias signals (e.g., 10-20 Hz, or even multiple seconds of continuous DC), measure contact potential and/or disk clearance over numerous revolutions of the hard disk when the bias is applied, thus resulting in the measurement of entire data tracks. Another method applies a constant voltage between the slider body and the hard disk over multiple revolutions of the hard disk. The amplitude of a readback signal is then sampled as the hard disk revolves. Furthermore, the method is performed over larger segments of the data track, resulting in less precise measurement due to noise. As a result, circumferential variations due to disk micro-waviness can not be resolved with other methods as with the present invention. These variations in surface topography of the disk (e.g., micro-waviness, roughness, and/or texture) can also cause variations in the contact potential over different locations on the disk which cannot be precisely mapped using the longer voltage pulses of the conventional art. Additionally, the longer voltage bias used in conventional methods increases the likelihood of lubricant migration and of particles being drawn into the slider/disk interface and causing damage. In the present invention, the shorter duration of the voltage pulses, as well as the use of positive and negative voltage pulses, reduces the risk of charging the slider/hard disk interface. Thus, there is less likelihood of lubricant migration and/or drawing particles to the slider/hard disk interface in embodiments of the present invention. Furthermore, by applying the same voltage numerous times over the same portion of hard disk 102 and deriving a corresponding average clearance, a more accurate measurement of the contact potential and/or disk clearance at that discrete location of the hard disk is possible than in conventional methods.

Figure 6A:
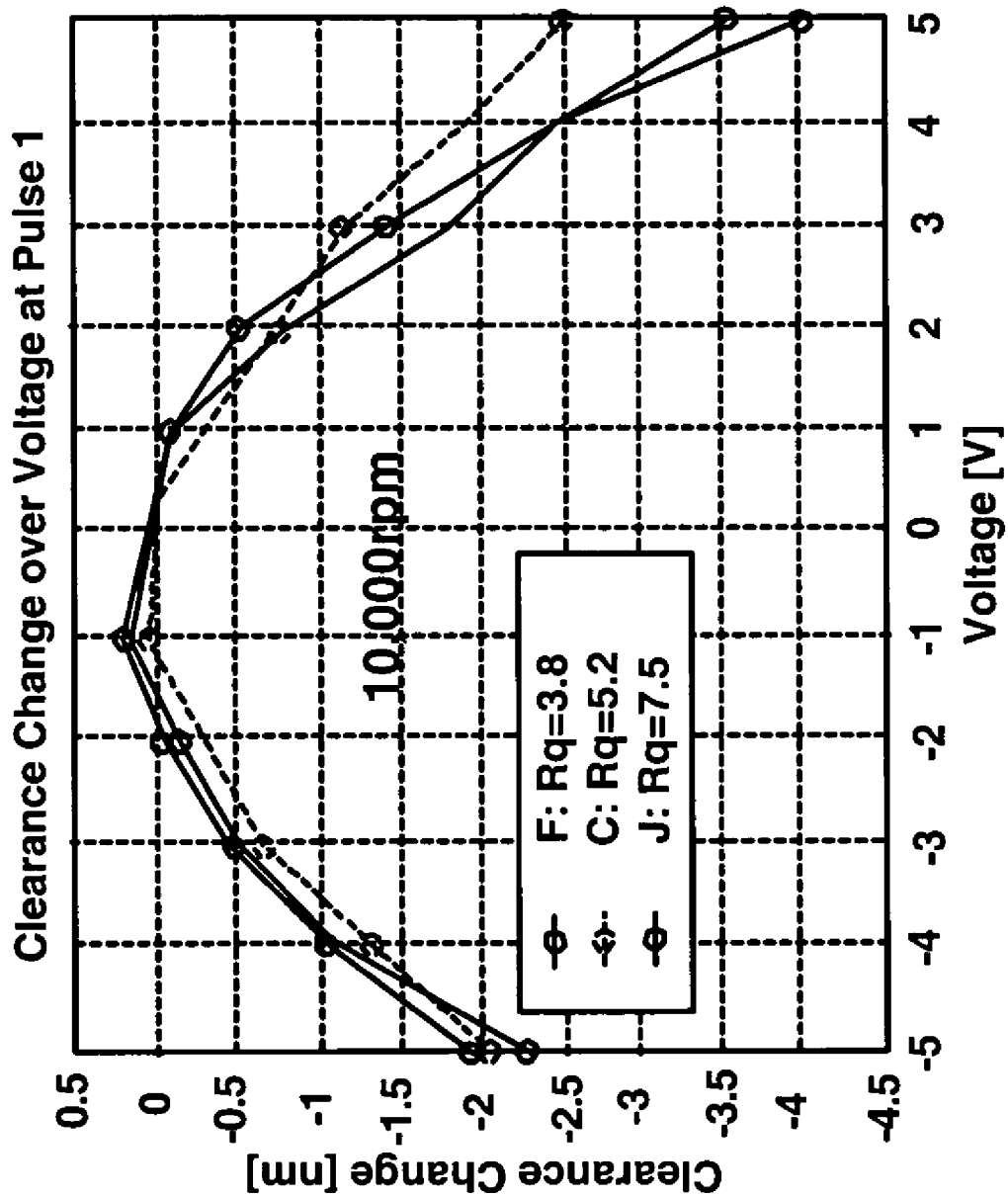
FIGS. 6A and 6B are graphs showing the clearance of a slider body relative to a hard disk in response to variations in an applied bias voltage in accordance with embodiments of the present invention.
Figure 6B:
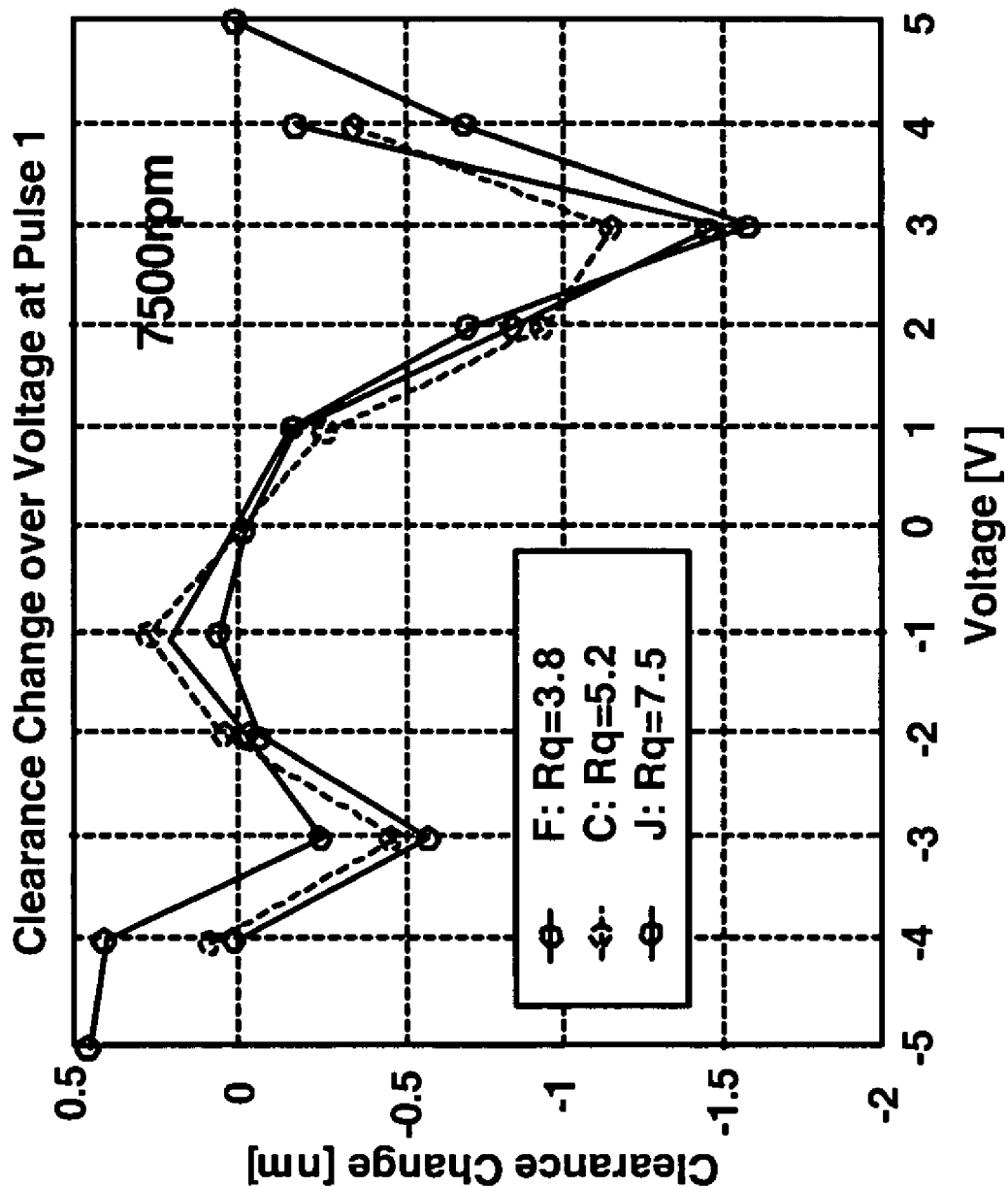

FIGS. 6A and 6B are graphs showing variations in the clearance of a slider body relative to a hard disk in response to variations in an applied bias voltage in accordance with embodiments of the present invention. In FIG. 6A, a positive DC voltage pulse of 1 volt (e.g., pulse 521 of FIG. 5A) causes the clearance of slider body 101 to drop approximately 0.1 nanometer relative to the clearance of slider body 101 when no voltage pulse is applied (e.g., 510 of FIG. 5A). When a negative DC voltage pulse of 1 volt (e.g., pulse 531 of FIG. 5A) is applied, the clearance of slider body 101 rises approximately 0.2 nanometers relative to the clearance of slider body 101 when no voltage pulse is applied (e.g., 510 of FIG. 5A). A positive DC voltage pulse of 2 volts (e.g., pulse 541 of FIG. 5A) causes the clearance of slider body 101 to drop 0.6 nanometers relative to when no voltage pulse is applied (e.g., 510 of FIG. 5A). A negative DC voltage pulse of 2 volts (e.g., pulse 551 of FIG. 5A) causes the clearance of slider body 101 to drop approximately 0.2 nanometers relative to when no voltage pulse is applied (e.g., 510 of FIG. 5A). In FIG. 6A the plot of the changes in the clearance of slider body 101 is continued through a voltage of +5 volts DC and −5 volts DC. It is noted that in FIG. 6A, the clearance of slider body 101 reaches a peak at approximately −1 volt. This indicates that the contact potential voltage is approximately 1 volt. Subsequently, during normal operation of hard disk drive 100, a bias of −1 volt can be applied to the interface of slider 101 and hard disk 102 to eliminate the contact potential voltage.

In FIG. 6B, a positive DC voltage pulse of 1 volt (e.g., pulse 521 of FIG. 5A) causes the clearance of slider body 101 to drop approximately 0.2 nanometers relative to the clearance of slider body 101 when no voltage pulse is applied (e.g., 510 of FIG. 5A). When a negative DC voltage pulse of 1 volt (e.g., pulse 531 of FIG. 5A) is applied, the clearance of slider body 101 rises approximately 0.1-0.2 nanometers relative to the clearance of slider body 101 when no voltage pulse is applied (e.g., 510 of FIG. 5A). A positive DC voltage pulse of 2 volts (e.g., pulse 541 of FIG. 5A) causes the clearance of slider body 101 to drop 0.7-0.8 nanometers relative to the clearance of slider body 101 when no voltage pulse is applied (e.g., 510 of FIG. 5A). A negative DC voltage pulse of 2 volts (e.g., pulse 551 of FIG. 5A) causes no significant change in the clearance of slider body 101 relative to the clearance of slider body 101 when no voltage pulse is applied (e.g., 510 of FIG. 5A). In FIG. 6B the plot of the clearance of slider body 101 is continued through a voltage of +5 volts DC and −5 volts DC. Again, it is noted that in FIG. 6B, the clearance of slider body 101 reaches a peak at approximately −1 volt. This indicates that the contact potential voltage is approximately 1 volt. Subsequently, during normal operation of hard disk drive 100, a bias of −1 volt can be applied to the interface of slider 101 and hard disk 102 to eliminate the contact potential voltage.

Additionally, the maximum drop in the clearance of slider body 101 occurs when a bias of +3 volts DC is applied. This indicates that slider body comes into contact with hard disk 102 when a positive bias of +3 volts DC is applied. A similar effect is exhibited when a bias of −3 volts DC is applied. It is noted that there is a difference in maximum drop in the clearance when a positive or negative voltage is applied. This maybe caused by lube pooling between the slider and disk at the here exemplary slider disk combination which had a fairly thick lube film of 12 Angstrom Z-tetraol lubricant. This effect is minimized with reduced humidity and highly bonded lubricant. When biases of +/−4 volts and +/−5 volts are applied, slider body 101 exhibits a smaller drop in the clearance relative to hard disk 102.

Figure 7:
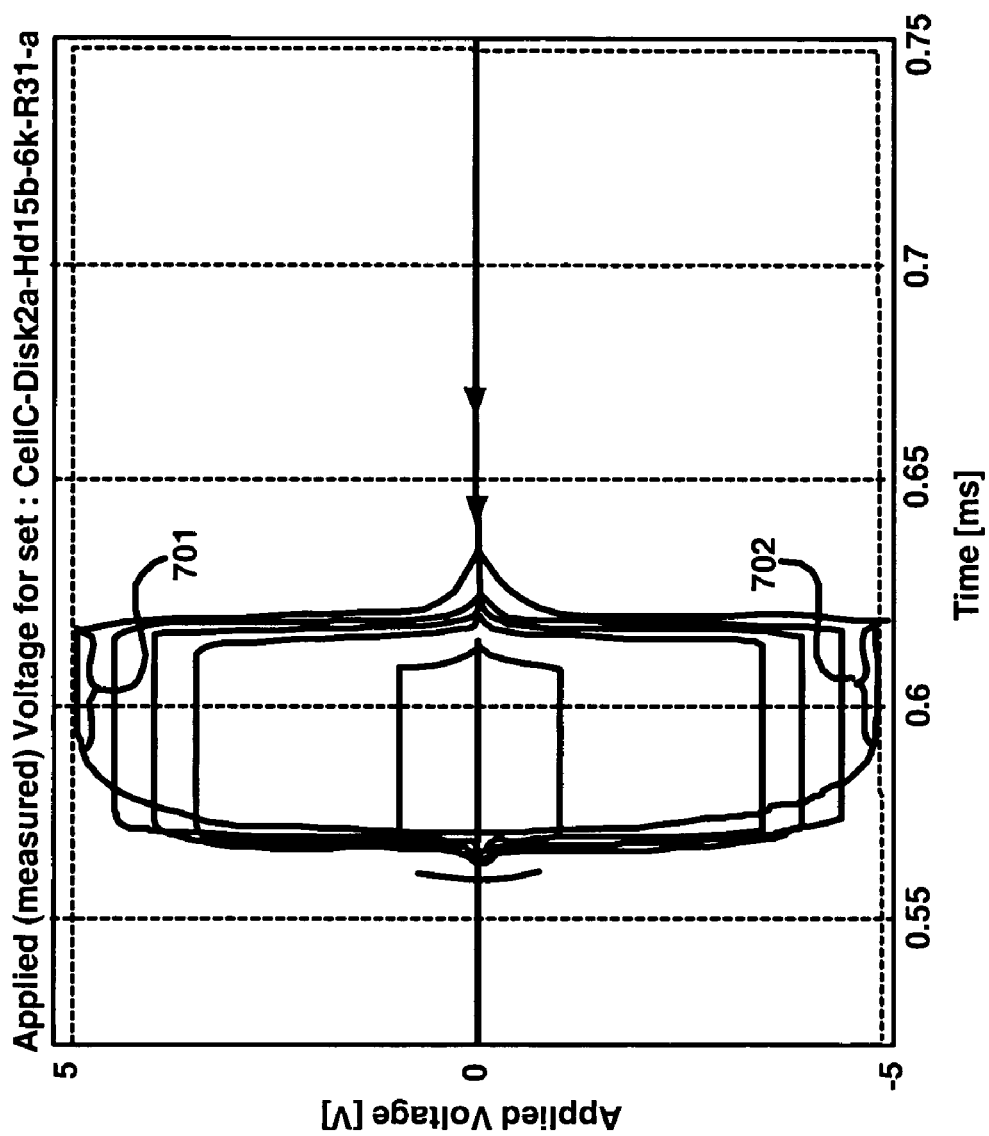
FIG. 7 is a graph showing the voltage pulses applied at various amplitudes to detect contact between a slider body and a hard disk in accordance with embodiments of the present invention

FIG. 7 is a graph showing a change in voltage supply when a slider body contacts the hard disk. In embodiments of the present invention, a contact between slider body 101 and hard disk 102 is detected by detecting a change in current. For example, in embodiments of the present invention, slider body 101 is electrically isolated from suspension 106 which is left at ground level. Slider body is directly coupled with a voltage source (e.g., voltage adjuster 430 of FIG. 4) and the electrical bias is applied to the slider/hard disk interface as described above. In embodiments of the present invention, the current supplied by voltage adjuster 430 is limited so that if the current limit is exceeded, the voltage pulse breaks down before damaging the interface. In embodiments of the present invention, voltage adjuster 430 is limited to providing current in the micro amp range or less. Low current sources will limit damage to the interface and cause immediate voltage breakdown at the faintest slider disk contact.

In FIG. 7, slider body 101 contacts hard disk 102 when a bias of 5 volts is applied. In regions 701 and 702, a breakdown in the voltage occurs, because the voltage adjuster 430 has been limited to supply no more than 2 milli-amps of current. When contact between slider body 101 and hard disk 102 occurs, voltage adjuster 430 cannot exceed 2 milli-amps of current and the voltage breakdown occurs.

It is noted that embodiments of the present invention may use other methods for detecting contact between slider body 101 and hard disk 102. However, monitoring current output from voltage adjuster 430 is typically more precise. For example, embodiments of the present invention may monitor the voltage supplied to the slider/hard disk interface, use a piezo-electric pressure sensor to monitor the mechanical pressure, and/or vibrations, acting upon slider body 101, or an acoustic monitor may be coupled with slider body 101 to detect when contact occurs. In anther embodiment, contact is indicated when the read back amplitude signal does not further increase with increased applied voltages. In another embodiment, contact is indicated when an increase in servo position error signal off-track vibrations are detected. Alternatively, an increase in the baseline magneto-resistive modulation indicates a contact between slider body 101 and hard disk 102. Thus, embodiments of the present invention can detect contact between slider body 101 and hard disk 102 more precisely than conventional methods and can minimize the duration of that contact.

Figure 8:
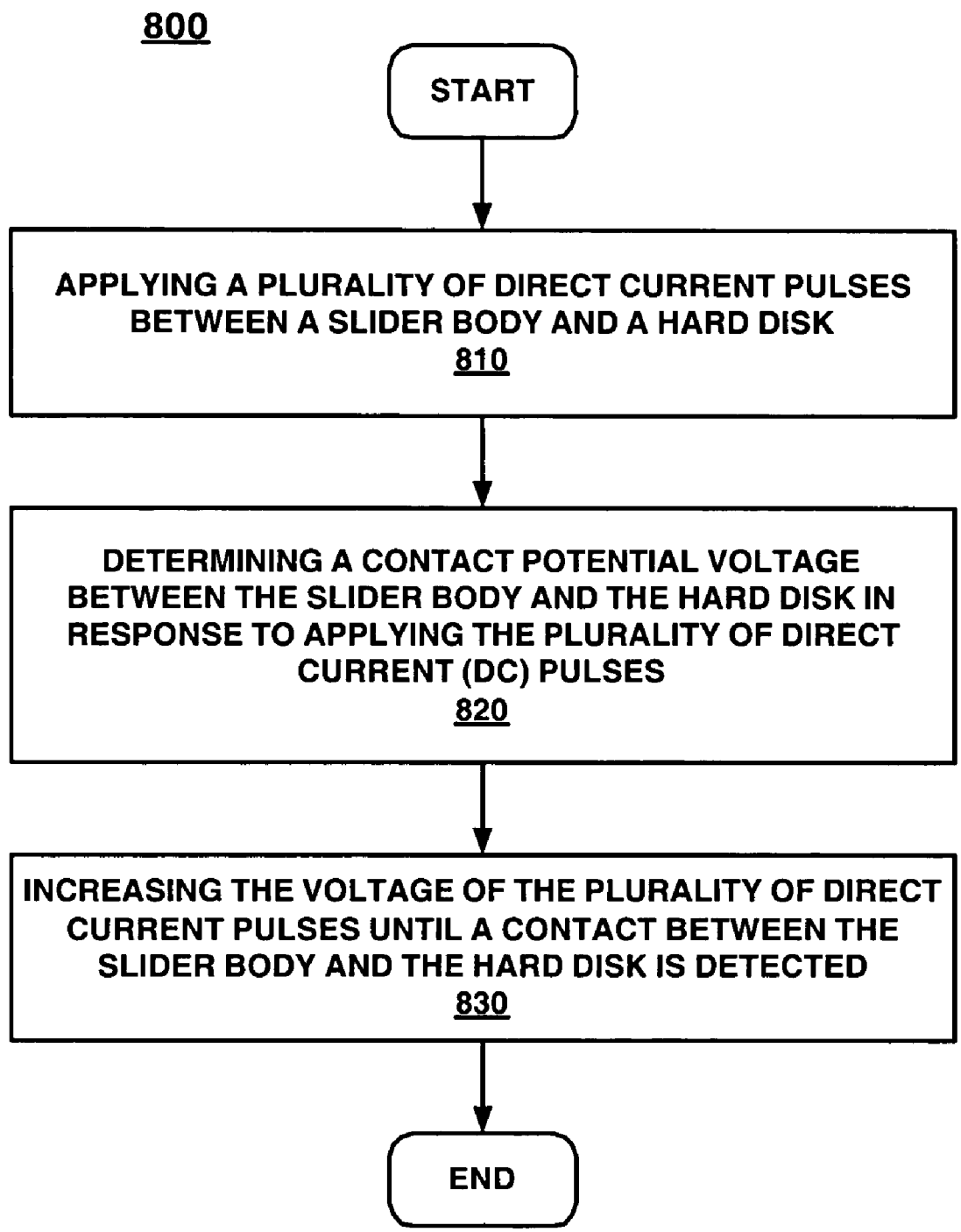
FIG. 8 is a flowchart of a method for simultaneously measuring contact potential and slider body clearance in a hard disk drive in accordance with embodiments of the present invention.

FIG. 8 is a flowchart of a method 800 for simultaneously measuring contact potential and slider body clearance in a hard disk drive in accordance with embodiments of the present invention. In step 810 of FIG. 8, a plurality of direct current (DC) pulses are applied between a slider body and a hard disk of a hard disk drive. As described above with reference to FIGS. 5A and 5B, embodiments of the present invention apply short duration DC pulses between slider body 101 and hard disk 102. Because of the short duration of these pulses, embodiments of the present invention can determine the contact potential voltage and/or disk clearance at discrete locations of the hard disk which are only portions of a data track of hard disk 102. In contrast, other methods use longer duration voltage pulses which typically determine contact potential and/or disk clearance over an entire data track. As a result, variations in the disk topography are not detected using those methods.

In another embodiment of the present invention, it is possible to apply a continuous voltage pulse between slider body 101 and hard disk 102 and measure the read back signal amplitude at different sectors of the disk, thereby measuring clearance at different locations within one revolution. However, a disadvantage of using a long continuous pulse is increased likelihood of lubricant pickup on the slider air bearing surface.

In step 820 of FIG. 8, a clearance voltage between the slider body and the hard disk is determined in response to applying the plurality of direct current (DC) pulses. In embodiments of the present invention, determination of the clearance between slider body 101 and hard disk 102 is based upon the maximum clearance of slider body 101 relative to hard disk 102. For example, referring again to FIG. 6B, it is determined that the maximum clearance of slider body 101 occurs when a direct current (DC) voltage of approximately −1 volt is applied between slider body 101 and hard disk 102. Again, the clearance of slider body 101 when −4 volts and −5 volts are applied is affected by lubricant pooling beneath slider body 101 due to the negative bias applied at the interface with hard disk 102.

In step 830 of FIG. 8, the voltage of the plurality of direct current (DC) pulses is increased until a contact between the slider body and the hard disk is detected. As described above with reference to FIGS. 5A and 5B, the voltage of the DC pulses is increased until the contact is detected. This is shown more clearly in FIG. 6B which indicates that contact between slider body 101 and hard disk 102 occurs when a voltage of +/−3 volts is applied. In embodiments of the present invention, contact between slider body 101 and hard disk 102 is detected by monitoring the current/voltage breakdown between the slider/hard disk interface.

The preferred embodiment of the present invention, simultaneous measurement off contact potential and slider body clearance in a magnetic disk drive, is thus described. While the present invention has been described in particular embodiments, it should be appreciated that the present invention should not be construed as limited by such embodiments, but rather construed according to the following claims.

What is claimed is:

1. A method for simultaneously measuring contact potential and slider body clearance in a hard disk drive, said method comprising:

applying a plurality of direct current (DC) pulses between said slider body and a hard disk of a magnetic disk drive, wherein said plurality of direct current (DC) pulses are applied at a plurality of discrete locations on said hard disk, wherein each pulse of said plurality of direct current (DC) pulses comprise an equivalent voltage and duration;

ceasing said applying a plurality of direct current (DC) pulses, measuring a contact potential voltage between said slider body and said hard disk at each of said plurality of discrete locations in response to applying said plurality of direct current (DC) pulses at said each of said plurality of discrete locations on said hard disk; and increasing the voltage of said plurality of direct current (DC) pulses at each of said plurality of discrete locations until a contact between said slider body and said hard disk at each of said plurality of discrete locations is detected, increasing said equivalent voltage and duration for each pulse; and measuring clearance of said slider body relative to said hard disk, said clearance measured at said contact potential voltage and said voltages for causing said contact.

2. The method as recited in claim 1 wherein said applying a plurality of direct current (DC) pulses further comprises:

applying a plurality of positive direct current (DC) pulses between said slider body and said hard disk at each of said plurality of discrete locations, wherein each of said positive direct current (DC) pulses comprise an analogous voltage and duration;

ceasing said applying a plurality of positive direct current (DC) pulses; and applying a plurality of negative direct current (DC) pulses between said slider body and said hard disk at each of said plurality of discrete locations, wherein each of said negative direct current (DC) pulses comprise an equal voltage and said duration.

3. The method as recited in claim 1 further comprising:

deriving an average clearance change of said slider body corresponding to said contact potential voltage and said voltages for causing said contact.

4. The method as recited in claim 3 wherein said deriving an average clearance change further comprises:

determining that said average clearance change comprises maximum clearance of said slider body.

5. The method as recited in claim 4 further comprising:

measuring said average clearance change of said slider body using an optical range determining device.

6. The method as recited in claim 4 further comprising:

determining said average clearance change of said slider body by sensing a variation in amplitude of a readback signal at each of said plurality of discrete locations.

7. The method as recited in claim 1 further comprising:

detecting a change in the current flow between said slider body and said hard disk when said contact occurs.

8. A system for simultaneously measuring contact potential and clearance between a slider body clearance and a hard disk of a hard disk drive comprising:

a housing;

a disk pack mounted to said housing and comprising said hard disk that is rotatable relative to said housing, the disk pack defining an axis of rotation and a radial direction relative to the axis;

a slider body mounted to said housing and disposed proximate to said hard disk;

a voltage adjuster coupled with said slider body and with said hard disk, said voltage adjuster comprising:

a direct current (DC) pulse generator for generating a plurality of direct current (DC) pulses at a plurality of discrete locations on said hard disk, wherein each pulse of said plurality of direct current (DC) pulses comprise an equivalent voltage and duration; and a direct current (DC) voltage controller;

a processor coupled with said voltage adjuster; and a detector coupled with said slider body and with said processor, said detector for measuring said contact potential, said detector for measuring said clearance.

9. The system of claim 8 wherein said voltage adjuster generates another plurality of direct current (DC) pulses at said plurality of discrete locations, said another plurality of direct current (DC) pulses having a bias different than said plurality of direct current (DC) pulses, and wherein each pulse in said another plurality of direct current (DC) pulses comprise an equal voltage and said duration.

10. The system of claim 9 wherein said processor determines an average clearance change of said slider body in response to said plurality of direct current (DC) pulses and said another plurality of direct current pulses.

11. The system of claim 8 wherein said detector comprises an optical range determining device.

12. The system of claim 8 wherein said detector comprises a component for sensing a variation in amplitude of a readback signal at each of said plurality of discrete locations, wherein each of said plurality of discrete locations is a designated portion of a data track of said hard disk.

13. The system of claim 8 further comprising:

a contact detector for detecting a contact between said slider body and said hard disk at each of said plurality discrete locations in response to an increase in a voltage generated by said direct current (DC) voltage adjuster.

14. The system of claim 8 wherein said voltage adjuster generates said plurality of direct current (DC) pulses having a positive bias and said another plurality of direct current (DC) pulses having a negative bias.

15. A system comprising:

a disk pack comprising at least one hard disk;

a slider body disposed proximate to said hard disk;

a voltage adjusting means for generating a plurality of direct current (DC) pulses between said hard disk and said slider body at a plurality of discrete locations of said hard disk, wherein each of said plurality of direct current (DC) pulses comprise an equivalent voltage and duration; and a controlling means for determining a contact potential voltage between said slider body and said hard disk and for controlling said voltage adjuster wherein the voltage of said plurality of direct current (DC) pulses is increased until a contact between said slider body and said hard disk is detected.

16. The system of claim 15 wherein said voltage adjusting means further comprises:

a pulse generating means for generating a direct current (DC) pulse having a positive voltage bias and for generating a direct current (DC) pulse having a negative voltage bias, wherein said positive voltage bias pulse and said negative voltage bias pulse comprise an analogous duration; and a voltage controlling means for controlling the voltage of said plurality of direct current (DC) pulses.

17. The system of claim 15 further comprising:

a detecting means for detecting a contact between said slider body and said hard disk.

18. The system of claim 15 further comprising:

a measuring means for measuring clearance change of said slider body relative to said hard disk.

19. The system of claim 18 wherein said controlling means is further for determining an average clearance change of said slider body in response to said plurality of direct current (DC) pulses.

20. The system of claim 15 wherein said controlling means is for causing said voltage adjusting means to generate each of said plurality of direct current (DC) pulses when said slider body is proximate to each of said plurality of discrete locations of said hard disk and wherein said each of said plurality of discrete locations is a portion of a data track.

\* \* \* \* \*